United States Patent Office 3,591,653
Patented July 6, 1971

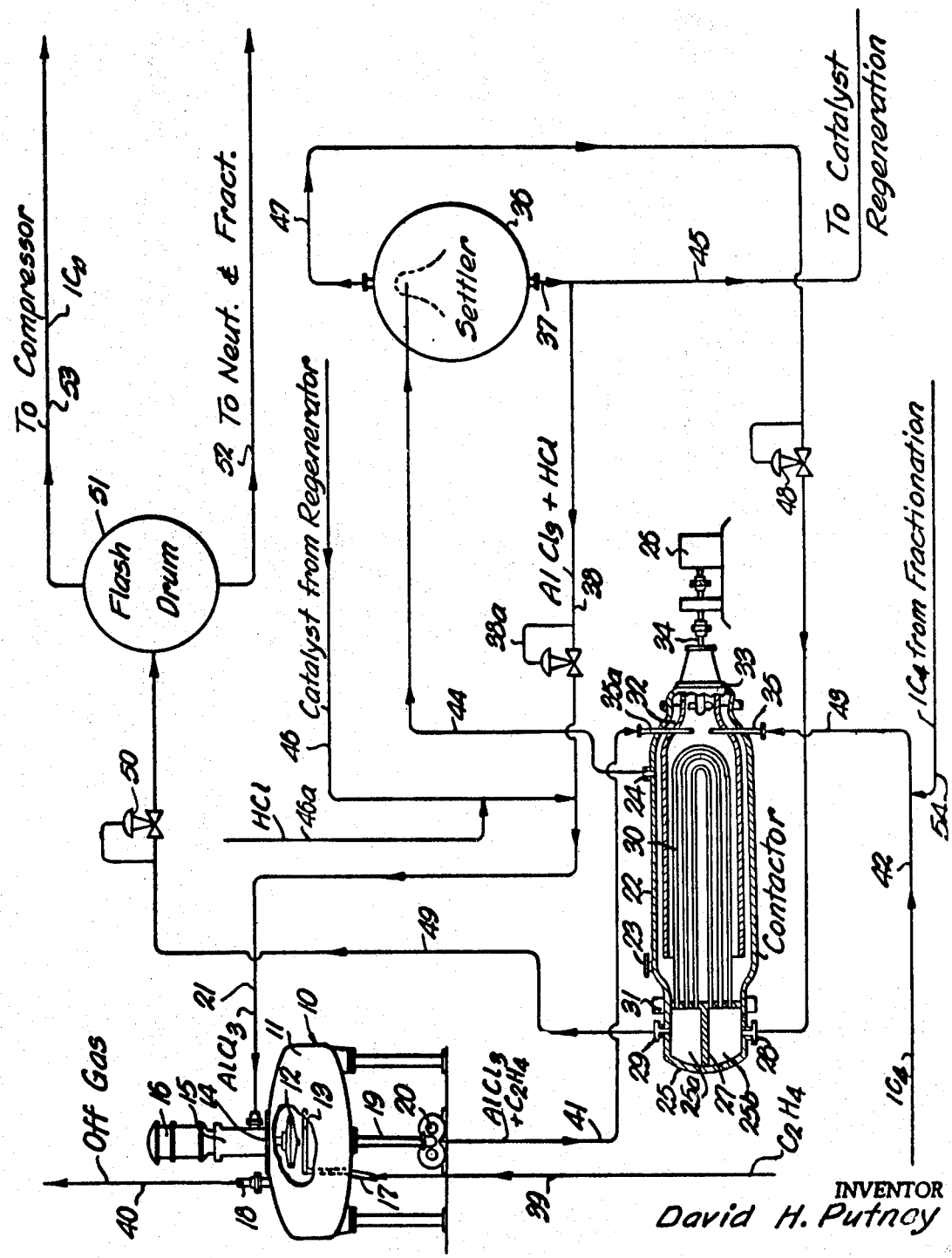

1

3,591,653
ETHYLENE ABSORPTION AND ALKYLATION
WITH ALUMINUM CHLORIDE
David H. Putney, Shawnee Mission, Kans., assignor to
Stratford Engineering Corporation, Kansas City, Mo.
Filed Feb. 17, 1969, Ser. No. 799,680
Int. Cl. C07c 3/56
U.S. Cl. 260—683.53                    10 Claims

ABSTRACT OF THE DISCLOSURE

Absorption of dilute ethylene streams (as from tail gas) with aluminum chloride complex catalyst in a separate absorption vesel, such as a flash vaporization reactor; alkylation of isobutane in a second reactor vessel such as a circulating pressurized mixer or contactor with the ethylene-aluminum chloride complex absorption product; separation of the reaction effluent from the second reactor with recycle of the relatively heavier catalyst phase to catalyst regeneration or directly to the ethylene absorption step and passage of the relatively light settler phase optionally through effluent refrigeration of the alkylation step before passage to neutralization and fractionation.

OBJECTS OF THE INVENTION

An object of the instant invention is to provide an improved process of and apparatus for absorbing dilute ethylene streams, for example tail gas from which $C_3$ and heavier hydrocarbons have been extracted, with aluminum chloride complex catalyst without compression, refrigeration and fractionation of the tail gases required.

Another object of the instant invention is to provide an improved alkylation process of isoparaffinic hydrocarbons (isobutane) with olefinic hydrocarbons (ethylene) wherein aluminum chloride complex catalyst with absorbed ethylene therein is alkylated with isobutane in a reactor vessel in such manner as to provide alkylate of improved characteristics.

Another object of the invention is to provide an improved alkylation process for the alkylation of isobutane with ethylene wherein aluminum chloride complex catalyst is used in an improved manner, wherein the heavier phase of the reaction effluent from the alkylation stage may be recycled either to catalyst regeneration or directly back to a separate ethylene absorption step before the alkylation step without recycle to the alkylation step.

Another object of the invention is to provide an improved ethylene alkylation process (with isobutane) wherein aluminum chloride complex catalyst is utilized in an improved fashion and wherein the overhead (hydrocarbon) phase from the settler receiving the reaction effluent from the alkylation stage may be utilized in effluent refrigeration of the alkylation reaction step before neutralization and fractionation thereof, thereby building up the isobutane concentration.

Another object of the invention is to provide an improved means, process and apparatus for utilizing the ethylene contained in tail gas from which $C_3$ and heavier hydrocarbons have been extracted, this absorption product, absorbed in aluminum chloride complex catalyst, being alkylated in a novel manner whereby to achieve new and desirable results in the alkylate (maximizing the production of high octane number alkylate in the $C_6$ boiling range which has a clear octane number in the order of 120 (+)).

Another object of the invention is to provide an ethylene alkylation process wherein liquefaction of the ethylene prior to alkylation thereof—and the expensive equipment therefor—are not required.

Another object of the invention is to provide an ethylene

2 alkylation process where the highly viscous $AlCl_3$ complex catalyst is optimally handled.

A further object of the invention is to provide an ethylene alkylation reaction where the tremendous heat of reaction is adequately handled in forced circulation pressurized reaction vessels (Stratco contactors) with indirect heat exchange of the reaction zone.

Another object of the invention is to provide an $AlCl_3$ catalysed alkylation system where the absorption of ethylene in this viscous material aids handling thereof before the alkylation reaction.

Other and further objects of the invention will appear in the course of the following description thereof.

The single figure is a schematic flow diagram showing means for absorbing ethylene in the aluminum chloride complex catalyst, means for alkylating the absorption product with isobutane, means for settling the reaction effluent into heavier and lighter phases, and means for handling the said heavier and lighter phases in recycle processing.

A flash evaporating or atomizing rotor of the type useable in the instant invention is seen in the patent to H. W. Stratford, 2,990,011, "Flash Evaporator Rotor," issued June 27, 1961. Other relevant rotor constructions may be seen in Graham, 3,233,655, "Liquid Atomization Apparatus," issued Feb. 8, 1966; Graham, 3,269,660, "Mixing Atomizing Rotor," issued Aug. 30, 1966; Graham, 3,355,106, "Mixing Atomizing Rotor," issued Nov. 28, 1967.

Referring to the drawing, a Stratco flash evaporator is shown generally designated at 10 having a vessel shell 11, an atomizing rotor 12 as seen in the patents to Stratford and Graham, supra, a gas input or sparger ring 13 mounted below the rotor, a drive shaft 14 for the rotor, a feed hood 15 for the rotor and a power source 16 for the rotor. Input line 17 to the rotor leads to sparger ring 13. Off gas is taken from line and fitting 18. Liquid bottoms are withdrawn from the vessel through line 19 passing to pump 20. The input line to the rotor is designated 21. Alternate absorption vessels at 10 are a packed tower or a counterflow bubble tray tower. These and the flash evaporator can handle enormous quantities of gas phase readily.

Referring to the lower left center of the drawing, therein is seen a Stratco contactor reactor or circulating vessel having an external shell 22 with output fittings 23 and 24, a header 25 and a power source 26. Header 25 is divided by bulkhead 27 into zones 25a and 25b, there being input and output fittings and lines 28 and 29 to the header zones 25a and 25b, respectively. A tube bundle 30 is connected into header wall 31 and receives heat exchanging fluid from the zones of header 25. A circulating tube 32 receives at one end the tube bundle and, at the other end, a circulating impeller 33 mounted on drive shaft 34 and driven by motor 26. First and second liquid input lines and pipes 35 and 35a penetrate the vessel shell 22 and circulating tube 32 to discharge liquids immediately before impeller 33. The latter circulates liquid down circulating tube 32 from heat exchanging coil 30 into the annulus between the circulating tube and shell 22.

A contacting mixing vessel of the type preferably used at 22 may be seen in Putney, 2,979,308, "Apparatus for Controlling Temperature Changes . . ." issued Apr. 11, 1961; Webb, Jr., 3,027,242, "Concentric Injecter for Circulating Tube Reactor," issued Mar. 27, 1962, as well as in D. H. Putney, 2,800,307 "Apparatus for Controlling Temperature Change," issued July 23, 1957.

Referring back to the drawing, aluminum chloride catalyst in anhydrous hydrogen chloride is recycled from settler 36 via lines 37 and 38, as well as 21, into rotor 12 of the flash evaporator 10. Atomizing rotor 12 throws an atomized, dispersed, catalyst ($AlCl_3$+HCl) spray which is contacted with the tail gas containing ethylene which is input via line 39 and pipe 17 into ring 13 below the rotor. Off gas is taken out fitting 18 and line 40.

Bottoms from the flash evaporator housing 10 are taken off via pipe 19 through pump 20 and line 41 to pass into the contactor 22 via pipe or fitting 35a. The contents of line 41 are aluminum chloride complex catalyst and ethylene absorbed in same. It is most desirable to separately introduce the reactants to the reaction zone in the manner shown with $1C_4$ in pipe 35 and catalyst-ethylene input via pipe 35a so the violently exothermic reaction takes place in the circulating body of reaction product with turbulent mixing by impeller 33 immediately after input. The preferred flow in tube 32 is up the tube past pipes 35 and 35a to impeller 33. Two stage input and mixing with two impellers and spaced inputs may be used if desired. The alkylation reaction, involving the ethylene absorbed in the catalyst with the isobutane, takes place in contactor 22 with the effluent being passed, via line 44 to settler 36.

The bottoms from the settler, out line 37, are divided between line 38, previously mentioned, and line 45, the latter passing to catalyst regeneration. A back pressure valve 38a is employed on line 38 (or a liquid level control on settler 36) to handle the difference in pressure between the settler 36 and flash evaporator 10. The catalyst from the regenerator is input to line 38 via line 46. Hydrochloric acid is added via line 46a to make up the catalyst complex.

The overhead from the settler passes out line 47 and, then, after passing through back pressure valve 48 on line 47, goes to header 25 through fitting 28 to provide effluent refrigeration of the reaction in contactor 22. After passing through tube bundle 30 and the upper side of the header 25, the settler overhead goes via line 49 past back pressure valve 50 to flash drum 51. The bottoms from the flash drum pass via line 52 to neutralization and fractionation. The overhead from the flash drum goes by line 53 to a compressor and condenser, not shown. This overhead is largely isobutane. Recycle isobutane from the fractionation deisobutanizer and the flash drum overhead reenters the system via line 54 connecting with line 42.

The operation in reactor 22 is at a temperature level (sufficiently low at 50° F.) that the settler 36 bottoms are effectively isobutane free. In sulfuric acid alkylation the acid recycle is to the alkylation reactor. Here the settler bottoms (catalyst) recycle is to the atomizing rotor 12. Flat acid is desired in this recycle not one with, say, 30% $1C_4$ recycled therewith. If flat acid is not recycled there will be a reaction problem with ethylene and $1C_4$ in the absorption stage at 10.

The tail gas goes into evaporator 10 rarely at a pressure substantially over the 10–15 p.s.i. at which it is available. Settler 36 and contactor 22 operate at roughly 150 p.s.i. held by valves 38a and 48.

Off gas through line 40 is the "mess" from the cat cracker after $C_3$ and heavier are out (i.e., ethane, methane, $CO_2$ and $H_2$).

Opening 23 is plugged if not in use. Valve 50 is optional, but in any case set lower than valve 48.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A process of alkylating isobutane with ethylene comprising:
   (a) contacting gaseous ethylene with aluminum chloride in anhydrous hydrogen chloride to form an absorption product of ethylene-aluminum chloride-hydrogen chloride complex;
   (b) passing said absorption product from said contacting step to an alkylation reaction zone wherein isobutane is mixed therewith, whereby to effect alkylation of the ethylene in said complex with the isobutane, and
   (c) separating said alkylation reaction mixture into an overhead, light phase containing alkylate product and a heavy, bottoms phase comprising said aluminum chloride.

2. A process as in claim 1 wherein said absorption step includes atomizing aluminum chloride in anhydrous hydrogen chloride through an atomizing evaporator for contact with said ethylene.

3. A process as in claim 1 wherein isobutane and the absorption product of the first step are alkylated in a circulating reaction vessel providing turbulent mixing of the reaction mixture with indirect heat exchanging means associated therewith.

4. A process as in claim 1 wherein the alkylation reaction product effluent from the second step is separated into said heavy and light phases in a settling step.

5. A process as in claim 4 with the additional step of passing at least a portion of said light phase as an effluent refrigerant in indirect heat exchange with respect to the alkylation reaction zone.

6. A process as in claim 4 wherein a portion of said heavy phase comprising aluminum chloride in anhydrous hydrogen chloride is passed to said absorption step.

7. An alkylation process comprising:
   (a) mixing aluminum chloride-anhydrous hydrogen chloride complex catalyst with gaseous ethylene in a separate vessel to form an absorption product of ethylene-aluminum chloride-anhydrous hydrogen chloride complex catalyst;
   (b) passing said absorption product to an alkylation reaction zone where isobutane is added thereto to initiate and effect an alkylation reaction, and
   (c) separating an alkylation product from the alkylation reaction mixture.

8. A process as in claim 7 wherein the alkylation reaction is conducted at a temperature of 50° F.

9. A process as in claim 7 wherein the alkylation reaction zone is pressurized at about 150 p.s.i.

10. A process as in claim 7 wherein the absorption reaction is pressurized at 10–15 p.s.i.

References Cited

UNITED STATES PATENTS

| | | | |
|---|---|---|---|
| 2,398,869 | 4/1946 | Thiele | 260—683.53 |
| 2,405,968 | 8/1946 | Lynch et al. | 260—683.57 |
| 2,406,709 | 8/1946 | Pevere | 260—683.53 |
| 2,409,389 | 10/1946 | Ringham | 260—683.53 |

DELBERT E. GANTZ, Primary Examiner

G. J. CRASANAKIS, Assistant Examiner

U.S. Cl. X.R.

260—683.57